United States Patent
Lewandowski et al.

(10) Patent No.: US 12,319,340 B2
(45) Date of Patent: Jun. 3, 2025

(54) LANE ASSISTANCE FOR VEHICLES WITH TRAILERS

(71) Applicant: Ford Global Technologies, LLC, Dearborn, MI (US)

(72) Inventors: Andrew Denis Lewandowski, Sterling Heights, MI (US); Jordan Barrett, Milford, MI (US); Brendan Francis Diamond, Grosse Pointe, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 17/816,739

(22) Filed: Aug. 2, 2022

(65) Prior Publication Data
US 2024/0043063 A1    Feb. 8, 2024

(51) Int. Cl.
| B62D 13/00 | (2006.01) |
| B62D 15/02 | (2006.01) |
| G06T 7/62 | (2017.01) |
| G06T 7/70 | (2017.01) |
| H04W 4/44 | (2018.01) |

(52) U.S. Cl.
CPC .............. *B62D 13/005* (2013.01); *G06T 7/62* (2017.01); *G06T 7/70* (2017.01); *H04W 4/44* (2018.02); *B62D 15/025* (2013.01); *G06T 2207/30256* (2013.01)

(58) Field of Classification Search
None
See application file for complete search history.

(56) References Cited

U.S. PATENT DOCUMENTS

| 11,231,716 | B2 | 1/2022 | Mepham et al. | |
| 11,628,863 | B1* | 4/2023 | Huang | B60W 60/0023 |
| | | | | 701/24 |
| 2009/0107735 | A1* | 4/2009 | Cleary | G01G 19/08 |
| | | | | 177/136 |
| 2009/0271078 | A1 | 10/2009 | Dickinson | |
| 2017/0341583 | A1* | 11/2017 | Zhang | H04N 7/181 |
| 2019/0016264 | A1* | 1/2019 | Potnis | G06N 3/08 |
| 2019/0258251 | A1 | 8/2019 | Ditty et al. | |
| 2020/0247471 | A1* | 8/2020 | Grodde | B60W 50/045 |
| 2022/0258800 | A1* | 8/2022 | Zimmermann | B62D 13/06 |
| 2022/0342038 | A1* | 10/2022 | Armbruster | G01S 13/931 |
| 2022/0410898 | A1* | 12/2022 | Nett | G05D 1/2446 |
| 2023/0260288 | A1* | 8/2023 | Young | G06V 20/56 |
| | | | | 382/104 |

FOREIGN PATENT DOCUMENTS

| WO | 2013187825 A1 | 12/2013 |
| WO | 2021041848 A1 | 3/2021 |

\* cited by examiner

*Primary Examiner* — Anne Marie Antonucci
*Assistant Examiner* — Kyle S Park
(74) *Attorney, Agent, or Firm* — Frank Lollo; Brooks Kushman P.C.

(57) ABSTRACT

Orientations of a vehicle with an attached trailer can be specified for obtaining respective images of the trailer. Respective images of the trailer captured by a vehicle camera at the specified orientations can then be received. The images can be input to a machine learning program trained to output trailer size metrics. The vehicle can then be controlled according to the trailer size metrics output from the machine learning program.

20 Claims, 8 Drawing Sheets

LANE ASSISTANCE FOR VEHICLES WITH TRAILERS

BACKGROUND

Vehicles may can tow trailers of varying sizes, e.g., varying dimensions, masses, and/or weights, in accordance with their respective tow ratings. Further, vehicles can tow trailers under various environmental conditions such as various wind conditions. Depending on its speed and direction, a force of wind on a trailer can affect vehicle operation.

DETAILED DESCRIPTION

Introduction

Figure 1:
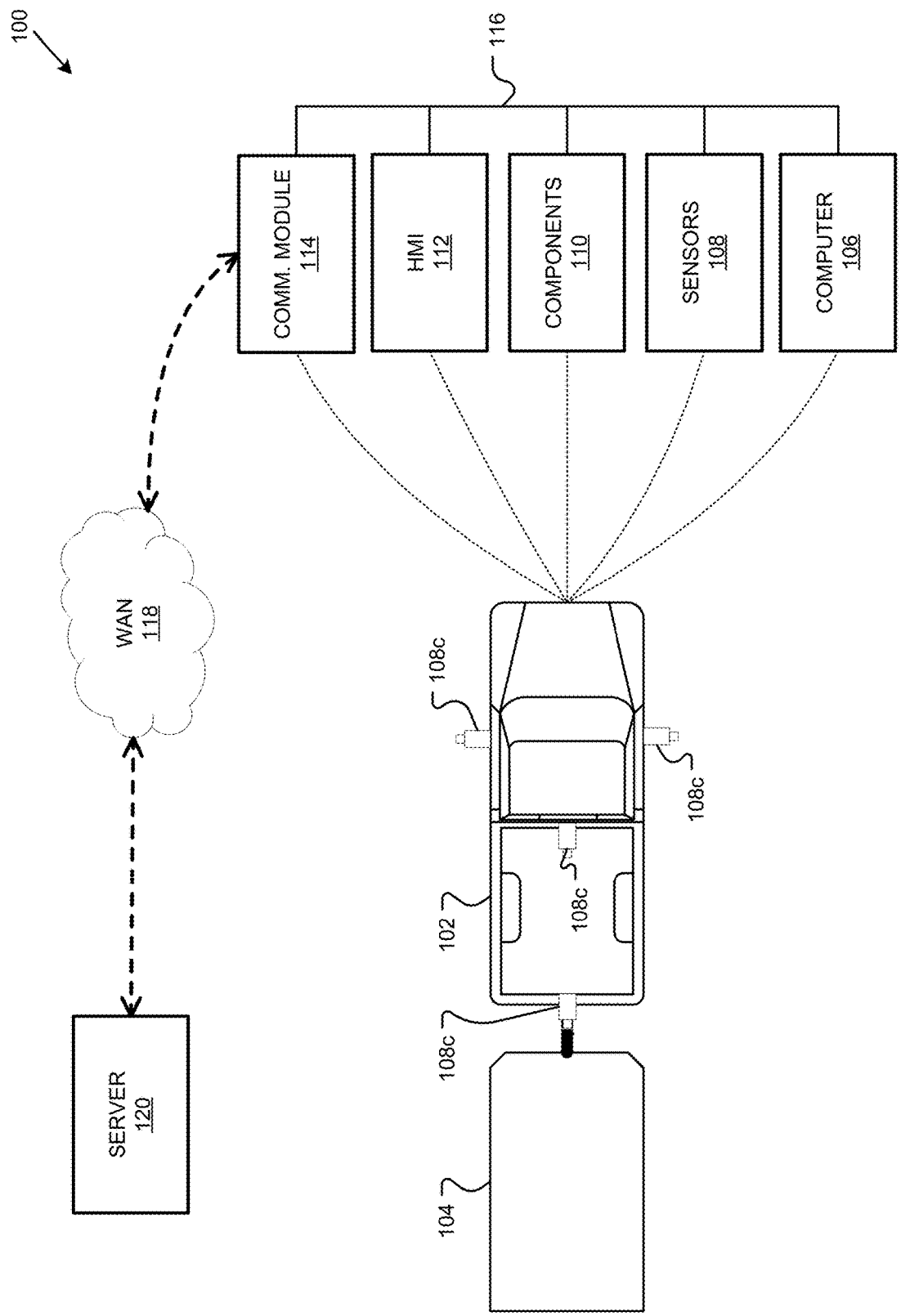
FIG. 1 is a diagram of an example vehicle-trailer operation system.

As illustrated in FIGS. 1-4C, a vehicle 102 can be attached to a trailer 104. The vehicle 102 can be configured to obtain data to determine size metrics of the trailer 104 that can then be provided as input for vehicle 102 operation while towing the trailer 104. For example, to obtain the data to determine the size metrics, the vehicle 102 can be controlled, and/or output can be provided directing a user to control the vehicle 102, to position the vehicle with respect to an attached trailer 104 to obtain images of the trailer 104. The images can then be provided to a machine learning program that outputs size metrics such as trailer 104 dimensions, trailer 104 weight, tongue weight, and/or trailer 104 mass. The size metrics can then be used for control of the vehicle 102. For example, the vehicle 102 could have one or more advanced driver assistance systems 100 (ADAS), including a steering assist system 100 such as a lane-centering and/or lane-keeping system 100. Trailer size metrics could be used to adjust one or more biases and/or gains applied to ADAS parameters. For example, trailer size metrics in combination with data about a wind speed and/or direction could be used to adjust biases and/or gains applied to wind data and determining outputs that can control a vehicle 102.

In one example, an ADAS could be configured to apply a steering wheel torque, i.e., an amount of rotational force to a steering wheel or steering column to affect steering, i.e., a direction or heading, of the vehicle 102. On a windy day with wind blowing substantially perpendicular to a vehicle 102 and trailer 104 direction of travel, wind striking the vehicle 102 likely would affect an amount of steering torque to be applied to maintain a position of a vehicle 102 in a lane of the roadway 128. In another example discussed further below, size metrics could be used to control and ADAS with respect to a lane-centering feature. In general, trailer size metrics may be useful in combination with wind data and/or other data about a vehicle 102 or an environment around the vehicle 102 to determine adjustments to ADAS parameters.

Accordingly, as described herein, a system can comprise a computer that can include a processor and a memory. The memory can store instructions executable by the processor such that the computer is programmed to: specify orientations of a vehicle with an attached trailer for obtaining respective images of the trailer; receive the respective images of the trailer captured by a vehicle camera at the specified orientations; input the images to a machine learning program trained to output trailer size metrics; and control the vehicle according to the trailer size metrics output from the machine learning program.

Controlling the vehicle according to the trailer size metrics can include one or both of adjusting a bias or adjusting a gain to a parameters of a steering assist system of the vehicle based on the trailer size metrics and one or both of a direction and magnitude of wind. Adjusting the bias or the gain can adjust an output steering wheel torque and/or an offset from a lane center.

The instructions can further include instructions to download from a remote server a trailer profile specifying a parameter for controlling the vehicle based on the trailer size metrics output from the machine learning program based on the images.

The trailer size metrics can include one or more of a mass of the trailer, a surface area of the trailer, a weight of the trailer, a tongue weight of the trailer, or a trailer dimension. The instructions can further include instructions to obtain the tongue weight of the trailer as output from scales onboard the vehicle. The instructions can further include instructions to obtain the mass of the trailer as output from a vehicle mass estimation module that uses vehicle powertrain data. The instructions can further include instructions to input an angle of incline to the machine learning program for at least one of the images. The instructions can further include instructions to control the vehicle to move so that the trailer is at one of the specified orientations. The instructions further can include instructions to output the specified orientations to a display device.

A method comprises: specifying orientations of a vehicle with an attached trailer for obtaining respective images of the trailer; receiving the respective images of the trailer captured by a vehicle camera at the specified orientations; inputting the images to a machine learning program trained to output trailer size metrics; and controlling the vehicle according to the trailer size metrics output from the machine learning program.

Controlling the vehicle according to the trailer size metrics can include one or both of adjusting a bias or adjusting a gain to a parameters of a steering assist system of the vehicle based on the trailer size metrics and one or both of a direction and magnitude of wind. Adjusting the bias or the gain can adjust an output steering wheel torque and/or an offset from a lane center.

A trailer profile can be downloaded from a remote server specifying a parameter for controlling the vehicle based on the trailer size metrics output from the machine learning program based on the images. The trailer size metrics can include one or more of a mass of the trailer, a surface area of the trailer, a weight of the trailer, a tongue weight of the trailer, or a trailer dimension. The tongue weight of the trailer can be obtained as one or more of output from scales onboard the vehicle or from a vehicle mass estimation module that uses vehicle powertrain data.

An angle of incline can be input to the machine learning program for at least one of the images. The vehicle can be controlled to move so that the trailer is at one of the specified orientations. The specified orientations can be output to a display device.

System Elements

As seen in FIG. 1, a vehicle 102 can include a computer 106, sensors 108, various other components 110, a human machine interface or HMI 112, in a communication module 114, as well as a communication network to enable communications between various of these elements, including as described herein. The vehicle 102 can be any machine-powered vehicle 102 (i.e., powered by an internal combustion engine and/or electric motor) capable of towing a trailer 104 and configured with one or more ADAS features as described herein.

The vehicle computer 106 (and also a remote server 120 discussed below) includes a processor and a memory. Further, the vehicle computer 106 could include a plurality of computers 106 in the vehicle 102, e.g., a plurality of ECUs or the like, operating together to perform operations ascribed herein to the vehicle computer 106. A memory of a computer 106 such as those described herein includes one or more forms of computer 106 readable media, and stores instructions executable by the vehicle computer 106 for performing various operations, including as disclosed herein. For example, a vehicle computer 106 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 108 data and/or communicating the sensor 108 data. In another example, a computer including a vehicle computer 106 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems 100 such as FPGA and ASIC. For example, an ASIC is manufactured based on VHDL programming provided pre-manufacturing, whereas logical components 110 inside an FPGA may be configured based on VHDL programming, e.g. stored in a memory electrically connected to the FPGA circuit. In some examples, a combination of processor(s), ASIC(s), and/or FPGA circuits may be included in a computer.

The memory can be of any type, e.g., hard disk drives, solid state drives, or any volatile or non-volatile media. The memory can store the collected data sent from the sensors 108. The memory can be a separate device from the computer 106, and the computer 106 can retrieve information stored by the memory via a communication network in the vehicle 102 such as via the vehicle network 116, e.g., over a CAN bus, a wireless network, etc. Alternatively or additionally, the memory can be part of the computer 106, e.g., as a memory of the computer 106.

The computer 106 may include programming to operate one or more components 110 such as vehicle 102 brakes, propulsion (e.g., one or more of an internal combustion engine, electric motor, hybrid engine, etc.), steering, climate control, interior and/or exterior lights, etc., as well as to determine whether and when the computer 106, as opposed to a human operator, is to control such operations. Additionally, the computer 106 may be programmed to determine whether and when a human operator is to control such operations. The computer 106 may include or be communicatively coupled to, e.g., via a vehicle network 116 such as a communications bus as described further below, more than one processor, e.g., included in components 110 such as sensors 108, electronic control units (ECUs) or the like included in the vehicle 102 for monitoring and/or controlling various vehicle components, e.g., a powertrain controller, a brake controller, a steering controller, etc.

The computer 106 is generally arranged for communications on a vehicle network 116 that can include a communications bus in the vehicle 102 such as a controller area network CAN or the like, and/or other wired and/or wireless mechanisms. The vehicle network 116 is a communications network via which messages can be exchanged between various devices, e.g., sensors 108, components 110, computer 106(s), etc. in vehicle 102. The computer 106 can be generally programmed to send and/or receive, via vehicle network 116, messages to and/or from other devices in vehicle 102 e.g., any or all of ECUs, sensors 108, actuators, components 110, communications module, a human machine interface (HMI), etc. For example, various component 110 subsystems (e.g., components 110 can be controlled by respective ECUs) and/or sensors 108 may provide data to the computer 106 via the vehicle network 116. Further, in cases in which computer 106 actually comprises a plurality of devices, the vehicle network 116 may be used for communications between devices represented as computer 106 in this disclosure. For example, vehicle network 116 can include a controller area network CAN in which messages are conveyed via a CAN bus, or a local interconnect network LIN in which messages are conveyed via a LIN bus. In some implementations, vehicle network 116 can include a network in which messages are conveyed using other wired communication technologies and/or wireless communication technologies e.g., Ethernet, WiFi®, Bluetooth®, etc. Additional examples of protocols that may be used for communications over vehicle network 116 in some implementations include, without limitation, Media Oriented System 100 Transport MOST, Time-Triggered Protocol TTP, and FlexRay. In some implementations, vehicle network 116 can represent a combination of multiple networks, possibly of different types, that support communications among devices in vehicle 102. For example, vehicle network 116 can include a CAN in which some devices in vehicle 102 communicate via a CAN bus, and a wired or wireless local area network in which some device in vehicle 102 communicate according to Ethernet or Wi-Fi communication protocols.

The vehicle 102 typically includes a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system 100 GPS sensors 108; accelerometers such as piezo-electric or microelectromechanical systems 100 MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Sensor 108 operation can be affected by obstructions, e.g., dust, snow, insects, etc. Often, but not necessarily, a sensor 108 includes a digital-to-analog converter to converted sensed analog data to a digital signal that can be provided to a digital computer 106, e.g., via a network.

Sensors 108 can include a variety of devices, and can be disposed to sense and environment, provide data about a machine, etc., in a variety of ways. For example, a sensor 108 could be mounted to a stationary infrastructure element on, over, or near a road. Moreover, various controllers in a vehicle 102 may operate as sensors 108 to provide data via the vehicle network 116 or bus, e.g., data relating to vehicle 102 speed, acceleration, location, subsystem and/or component 110 status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component 110, a location of an object, a speed of an object, a type of an object, a slope of a roadway 128, a temperature, an presence or amount of moisture, a fuel level, a data rate, etc.

In one example, the vehicle 102 includes a plurality of camera sensors 108*c*. As discussed below, the camera sensors 108*c* can be used to obtain images of a trailer 104 attached to the vehicle 102.

The computer 106 may include programming to command one or more actuators to operate one or more vehicle 102 subsystems or components 110, such as vehicle 102 brakes, propulsion, or steering. That is, the computer 106 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 106 may include or be communicatively coupled to, e.g., via a vehicle network 116, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle 102 can include an HMI 112 (human-machine interface), e.g., one or more of a display, a touchscreen display, a microphone, a speaker, etc. The user can provide input to devices such as the computer 106 via the HMI 112. The HMI 112 can communicate with the computer 106 via the vehicle network 116, e.g., the HMI 112 can send a message including the user input provided via a touchscreen, microphone, a camera that captures a gesture, etc., to a computer 106, and/or can display output, e.g., via a screen, speaker, etc. Further, at least some operations of the HMI 112 could be performed by a portable user device (not shown) such as a smart phone or the like in communication with the vehicle computer 106, e.g., via Bluetooth or the like. For example, user input to request determination of trailer size metrics and output concerning positioning a vehicle 102 to obtain images for determining trailer size metrics could be received and/or provided via a user device.

The computer 106 may be configured for communicating via a vehicle 102 to vehicle 102 communication module 114 or interface with devices outside of the vehicle 102, e.g., through a wide area network 118 and/or vehicle 102 to vehicle 102 V2V, vehicle-to-infrastructure or everything V2X or vehicle-to-everything including cellular communications C-V2X wireless communications cellular, DSRC., etc. to another vehicle 102, to an infrastructure element typically via direct radio frequency communications and/or typically via the network a remote server 120. The module could include one or more mechanisms by which the computers 106 of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

A computer 106 can be programmed to communicate with one or more remote sites such as a remote server 120, via a wide area network 118. The wide area network 118 can include one or more mechanisms by which a vehicle computer 106 may communicate with, for example, a remote server 120. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X CV2X, Dedicated Short Range Communications DSRC, etc., local area networks and/or wide area networks 118, including the Internet, providing data communication services.

The server 120 may include one or more computing devices, e.g., having respective processors and memories and/or associated data stores, that are accessible via the wide area network 118.

Exemplary Operations

A vehicle computer 106 can be programmed to specify orientations of a vehicle 102 with an attached trailer 104 for obtaining respective images of the trailer 104. For example, a user could provide input via an HMI 112 (or, as noted above, the user device such as a smart phone) specifying that a trailer 104 is attached to the vehicle 102. The vehicle computer 106 could be programmed to determine an orientation of the vehicle 102 to capture images of the trailer 104 and/or to control the vehicle 102 to a desired orientation. In this context, an orientation of the vehicle 102 means an angle of a longitudinal vehicle axis 124 to a longitudinal trailer axis 122. The desired orientation is specified so that the trailer 104 is oriented with respect to the vehicle 102 for vehicle 102 camera sensors 108*c* to obtain images of the trailer 104 that can be used to determine size metrics. Further, the vehicle computer 106 can determine a path of the vehicle 102 to move the vehicle 102 to a location to obtain the desired orientation. The orientation, the location, and/or the path can be output via an HMI 112.

Figure 2:
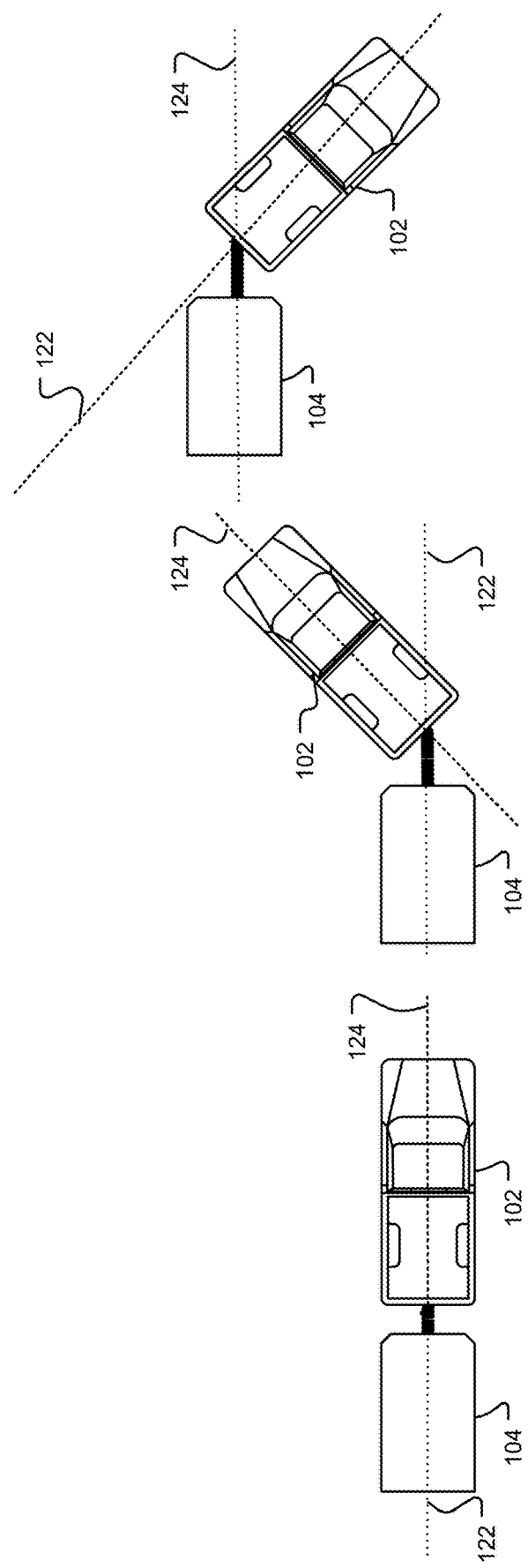
FIG. 2 shows three example orientations of the vehicle with respect to a trailer.

Typically, the vehicle axis 124 and trailer axis 122 are respective center axes. FIG. 2 shows three example orientations of the vehicle 102 with respect to the trailer 104. In the leftmost orientation, the vehicle axis 124 and the trailer axis 122 are: colinear, i.e., are on a common line, or, put another way, have a 180° angle with respect to one another. For the center and rightmost orientations, this description assumes that turning the vehicle 102 to the left (a left-turn orientation) or to the right (a right-turn orientation) decreases the angle in terms of an absolute value. That is, in the center orientation shown in FIG. 2, the vehicle axis 124 and the trailer axis 122 are at an angle with respect to one another of less than 180°, and in the rightmost orientation shown in FIG. 2 the vehicle axis 124 and the trailer axis 122 are at an angle with respect to one another of greater than 180°, i.e., in absolute terms both angles are less than 180°. In the illustrated implementation, the left-turn orientation and the right-turn orientation are the angles resulting from turning vehicle 102 wheels to the left and right, respectively, to minimize or maximize, as the case may be, for the left-turn orientation and the right-turn orientation, respectively, the angle between the trailer axis 122 and vehicle axis 124.

As mentioned above, the vehicle computer 106 can determine a path for the vehicle 102 to move to a location to obtain a desired orientation for capturing images. For example, the vehicle computer 106 can retrieve a stored minimum turning radius of the vehicle 102, and can then determine a distance to move the vehicle 102 according to the stored minimum turning radius so that the vehicle axis 124 and trailer axis 122 are at the minimum or maximum angle. For example, the vehicle 102 can perform simultaneous localization and mapping (SLAM) and path planning to determine a path of the vehicle 102 to the determined location. Further, the vehicle 102 can perform object detection with data from vehicle 102 sensors 108 to determine if any obstacles prevent the vehicle 102 from moving to the location. Further, the computer 106 can cause the vehicle 102 to actuate components 110 to move the vehicle 102 to the location to obtain the desired orientation. Alternatively or additionally, the computer 106 could output the path for a user to operate the vehicle 102 to the location to obtain the desired orientation.

Once the vehicle 102 is at the location and desired orientation, a vehicle sensor 108, e.g., a camera sensor 108c, can capture the respective images of the trailer 104 captured by a vehicle 102 camera at the specified orientations. The images can then be received by the vehicle computer 106, e.g., via the vehicle network 116. The computer 106 can then input the images to a machine learning program trained to output trailer data 148 (see FIG. 5) including trailer size metrics. A trailer size metric is any physical measurement about a size of the trailer 104. As mentioned above, example size metrics include trailer 104 dimensions (height, length, and/or width), a surface area of the trailer 104, e.g., of a side or face of the trailer 104, trailer 104 weight, tongue weight (i.e., downward force on a trailer 104 hitch or other vehicle 102 attachment to the trailer 104), and/or trailer 104 mass. An example machine learning program is described in further detail with respect to FIG. 5, below.

The trailer size metrics output from the machine learning program can be used to control the vehicle 102, i.e., to adjust parameters of an ADAS used to assist and/or control vehicle 102 steering. In the context of this disclosure, an ADAS parameter is a value input to the ADAS to determine an output value according to which a vehicle 102 component 110 is actuated. For example, steering wheel torque is a parameter that can be output by an ADAS to actuate a vehicle 102 steering component 110 for lane keeping or lane centering features, for example. Parameters can be adjusted according to biases and gains. A gain in this context is a factor multiplied against an input value to one of increase or reduce a magnitude of the input value. A bias in this context (which could also be referred to as a weight) is a factor by which an input value can be weighted or adjusted with respect to other input values.

Various trailer size metrics could be analyzed using multivariate sensitivity analysis to determine biases and/or gains for parameters for an ADAS. For example, the multivariate sensitivity analysis could consider some or all of the size metrics mentioned above, as well as a wind speed and/or direction with respect to a travel path of the vehicle 102 to determine biases gains applied to an ADAS input parameter such as windspeed. Further, biases and/or gains for ADAS parameters could be adjusted based on trailer size metrics in combination with a wind speed and a vehicle 102 heading with respect to a wind direction such that as the vehicle 102 heading changes, e.g., as the vehicle 102 navigates around a curve in a roadway 128, parameters could be adjusted, e.g., a gain applied to a steering torque could be adjusted.

Figure 4A:
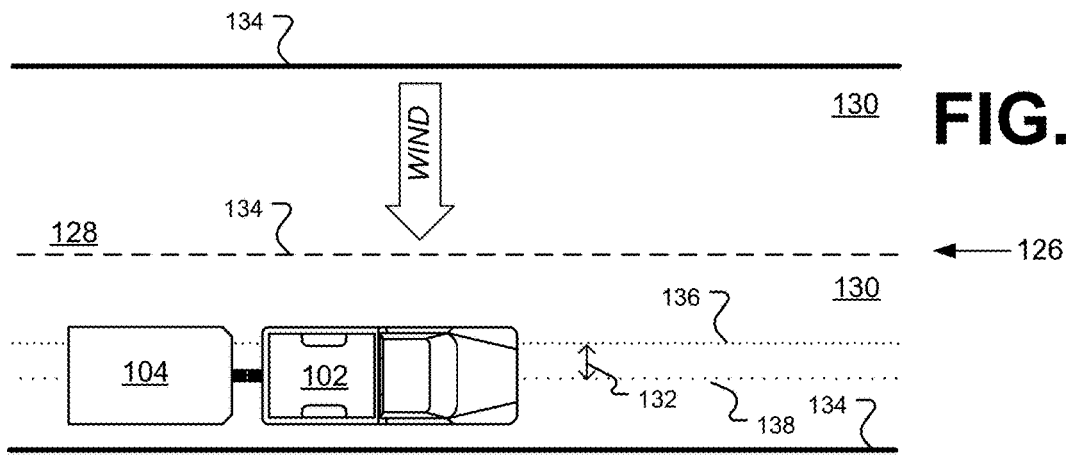
FIGS. 4A-4C illustrate traffic scenes in which a vehicle is towing a trailer in a travel lane of a roadway subject to wind conditions.
Figure 4B:
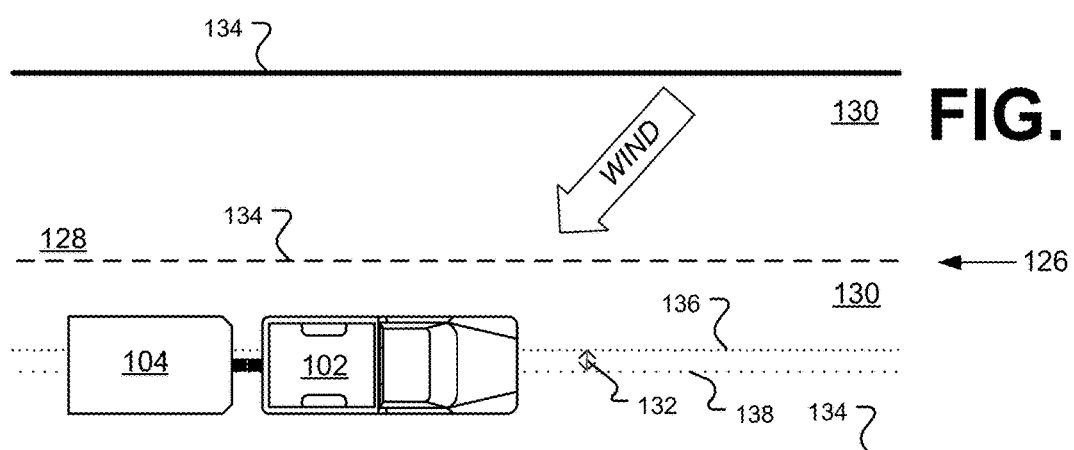
Figure 4C:
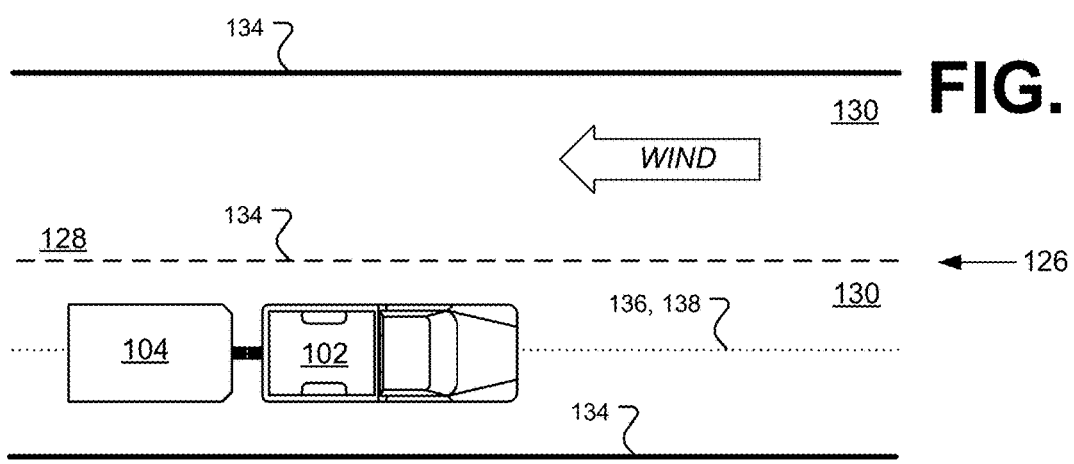

FIGS. 4A-4C illustrate traffic scenes 126 in which a vehicle 102 is towing a trailer 104 in a travel lane 130 of a roadway 128 subject to wind conditions. The example roadway 128 has two travel lanes 130 divided by a lane boundary 134 (and the travel lanes 130 also have lane boundaries 134 coterminous with an edge of the roadway 128). A lane-keeping ADAS could be provided to maintain, e.g., center, the vehicle 102 in its current travel lane 130, i.e., along a line defining a lane center 136, i.e., a centerline (or curve) equidistant from respective left and right lane boundaries 134. Under some conditions, the lane-keeping ADAS could be programmed to maintain the vehicle 102 along a line of travel 138 determined by a lane-center offset 132 from the lane center 136, e.g., under windy conditions it may be desirable to maintain a vehicle 102 a further distance from the lane boundary 134.

In the example of FIG. 4A, a bias and/or gain could increase a lane-center offset 132 and/or to determine a steering torque, e.g., based on wind conditions, to maintain the vehicle 102 along a desire line of travel 138. A wind direction is substantially perpendicular to a direction of travel of the vehicle 102 towing the trailer 104. Relative to examples in FIGS. 4B and 4C, in FIG. 4A a maximum gain, e.g., a gain value of 1, could be applied to a windspeed input to a lane-centering or lane-keeping algorithm for a larger lane-center offset 132. In FIG. 4B, the wind is at substantially a 45 degree angle to a direction of travel of the vehicle 102 with the trailer 104, and accordingly a relatively smaller gain may be applied to obtain a relatively smaller lane-center offset 132. In the example of FIG. 4C, the wind direction is substantially parallel to a vehicle 102 and trailer 104 direction of travel, and therefore no gain is applied, i.e., the lane center 136 and the selected line of travel 138 are a same line.

Processing

Figure 3:
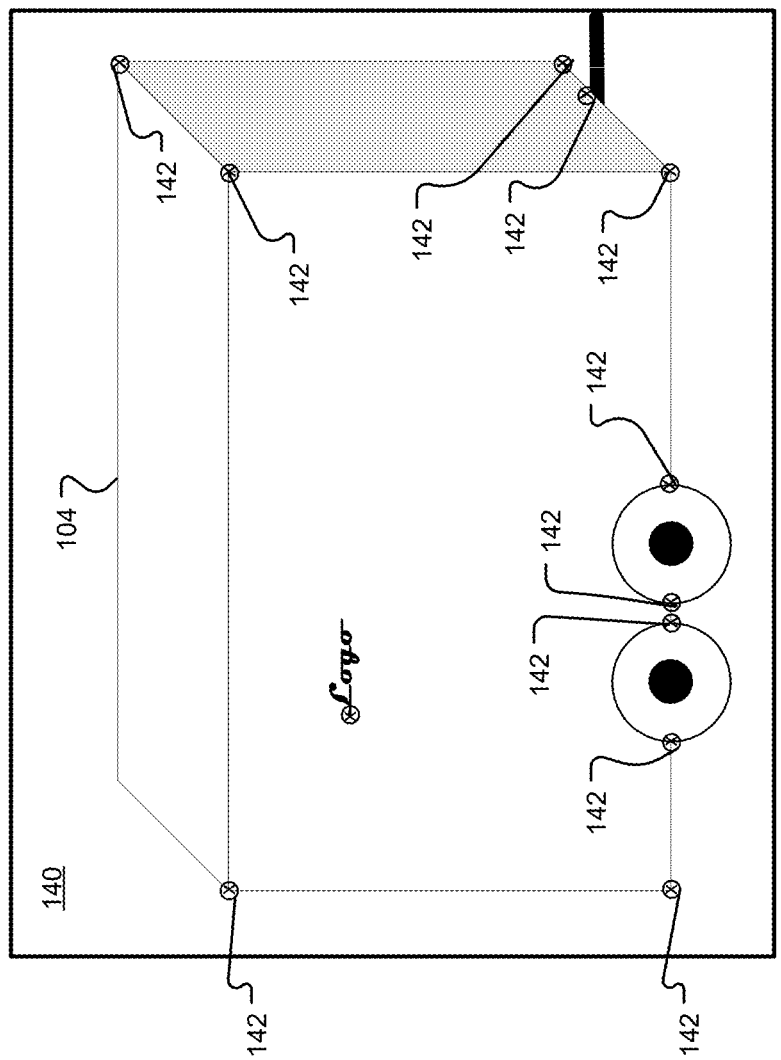
FIG. 3 shows an example trailer image that could be obtained from a vehicle camera sensor.

FIG. 3 shows an example trailer image 140 that could be obtained from a vehicle 102 camera sensor 108c. Trailer images 140 can be used to train a neural network so that when a vehicle 102 camera sensor 108c captures trailer images 140 as described above, the trailer images 140 can be used to estimate size metrics of the trailer 104. Note that in the presently described examples, images 140 are described as captured by a camera sensor 108c. However, it will be understood that images 140 could be captured by other imaging sensors 108, such as lidars or radars, and that such images 140 could be used within the system 100 as described herein.

Figure 5:
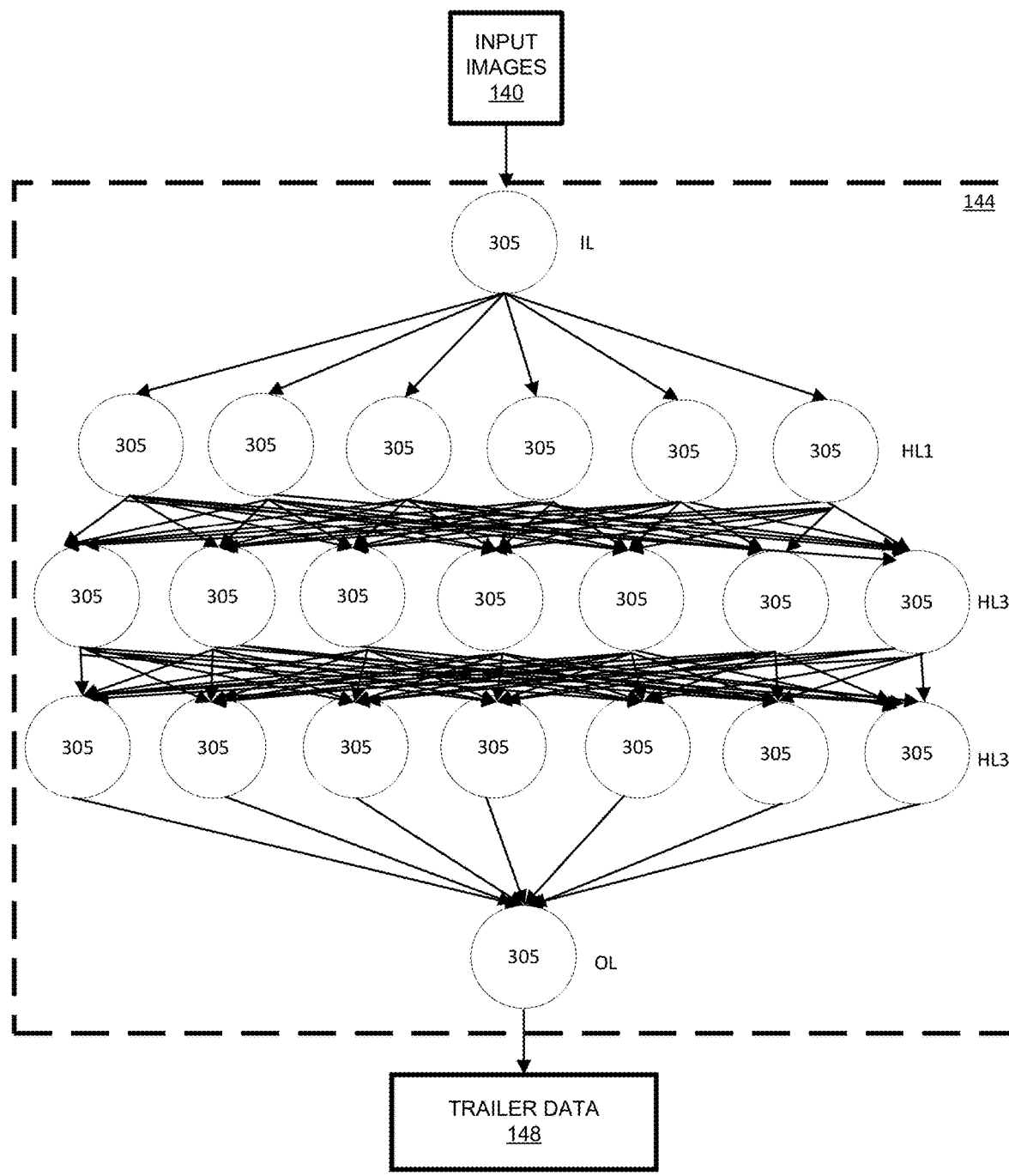
FIG. 5 shows an example neural network.

FIG. 5 shows an example deep neural network or DNN 144. A DNN 144 can be a software program that can be loaded in memory and executed by a processor included in a computer 106, for example. In an example implementation, the DNN 144 can include, but is not limited to, a convolutional neural network (CNN), Region-based CNN (R-CNN), Fast R-CNN, and Faster R-CNN. The DNN 144 can include a long short term memory (LSTM) in a recurrent neural network (RNN). The DNN 144 includes multiple nodes 146 or neurons. The neurons are arranged so that the DNN 144 includes an input layer, one or more hidden layers, and an output layer. Each layer of the DNN 144 can include a plurality of neurons. While three hidden layers are illustrated, it is understood that the DNN 144 can include additional or fewer hidden layers. The input and output layers may also include more than one node 146.

As one example, the DNN 144 can be trained with ground truth data, i.e., data about a real-world condition or state. For example, the DNN 144 can be trained with ground truth data and/or updated with additional data. Weights can be initialized by using a Gaussian distribution, for example, and a bias for each node 146 can be set to zero. Training the DNN 144 can include updating weights and biases via suitable techniques such as back-propagation with optimizations. Ground truth data means data deemed to represent a real-world environment, e.g., conditions and/or objects in the environment. Thus, ground truth data can include sensor 108 data depicting an environment, e.g., an object in an environment, along with a label or labels describing the environment, e.g., a label describing the object. Ground truth data can further include or be specified by metadata such as a location or locations at which the ground truth data was obtained, a time of obtaining the ground truth data, etc.

To train the DNN 144, a plurality (typically, thousands) of trailer images 140 can be input to the DNN 144, where the ground truth data describes one or more size metrics. One or more image landmarks 142 can be defined in respective trailer images 140, e.g., points identifiable as corners, edges of wheels, and end of a trailer 104 tongue, etc. The DNN 144 can be trained to identify images, including determining size metrics of trailers 104 in trailer images 140, based on a selected set of image landmarks 142, e.g., a specified set of quarter points in a trailer image 140. Further, additional data about the trailer images 140 can be used, including an incline (i.e., deviation from horizontal) of a surface on which a trailer image 140 was obtained, as well as an orientation of a vehicle 102 with respect to a trailer 104 in the trailer image 140 captured from the vehicle 102, e.g., as shown in FIG. 2, all the way to the right, all the way to the left, straight, etc. An incline of a vehicle 102 can be determined by an inclinometer sensor 108, as is known. Further, if the DNN 144 is trained using incline data, then an inclination of a vehicle 102 can be input to the DNN 144 when the DNN 144 is used to determine trailer size metrics. The DNN 144 can then output trailer data 148 that includes trailer size metrics, and/or data identifying a type of trailer 104, a number of wheels of the trailer 104, a shape profile of the trailer 104, etc.

Alternatively or additionally, size metrics can be obtained in other ways. For example, a tongue weight of a trailer 104 could be output from scales onboard the vehicle 102, e.g., as known in the "Onboard Scales and Smart Hitch" feature offered by Ford Motor Company. Further, a trailer 104 mass could be obtained from a vehicle 102 mass estimation module that uses vehicle 102 powertrain data, as is known. For example, a vehicle 102 powertrain controller can be calibrated based on empirical testing, i.e., accelerating a vehicle and comparing estimated output torque to a vehicle acceleration when the vehicle is not towing a trailer and when the vehicle is going trailers of various weights or masses. The feature can also be calibrated to take into account a number of passengers detected, adding to the overall mass. Such alternatively obtained size metrics could be used in combination with other size metrics output from the DNN 144.

Figure 6:
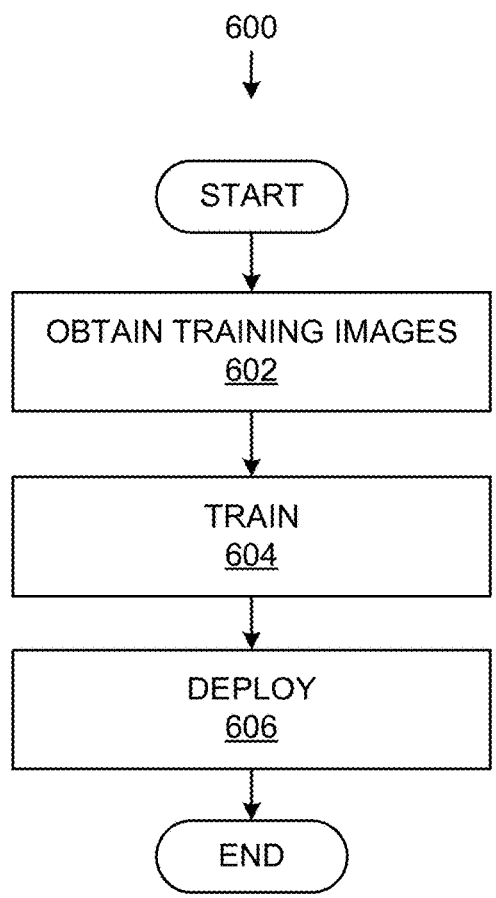
FIG. 6 is a process flow diagram of an example process 600 for providing a trained DNN that can output size metrics based on input trailer images.

FIG. 6 is a process flow diagram of an example process 600 for providing a trained DNN 144 that can output size metrics based on input trailer images 140. The process 600 begins in a block 602, in which trailer images 140 are obtained. As will be understood, training a machine learning program such as the DNN 144 may include obtaining thousands of images for which ground truth data can be specified. That is, for trailer images 140 to be used in training the DNN 144, the orientation of the vehicle 102 that obtained the image, a location of a camera sensor 108c on the vehicle 102 that obtained the image, and/or an inclination of a surface of a vehicle 102 and trailer 104 in the trailer image 140, as well as one or more size metrics of the trailer 104 in the trailer image 140, may be stored along with the trailer image 140. The ground truth data could also include data about a vehicle 102 and/or vehicle 102 camera sensors 108c used to capture the trailer image 140, e.g., a height of a camera sensor 108c from the ground, a distance of the camera sensor 108c from a vehicle 102 trailer 104 hitch, a direction of a camera sensor 108c lens, etc. Then, in a block 604, the DNN 144 can be trained with the trailer images 140 and associated ground truth data in a known manner to output size metrics. The DNN 144 could alternatively or additionally be trained to output a trailer 104 classification, e.g., a trailer 104 type such as two-wheel, four-wheel, horse trailer 104, car trailer 104, etc. Once the DNN 144 is trained, then in a block 606 it can be deployed to vehicle computers 106. Following the block 606, the process 600 ends.

Figure 7:
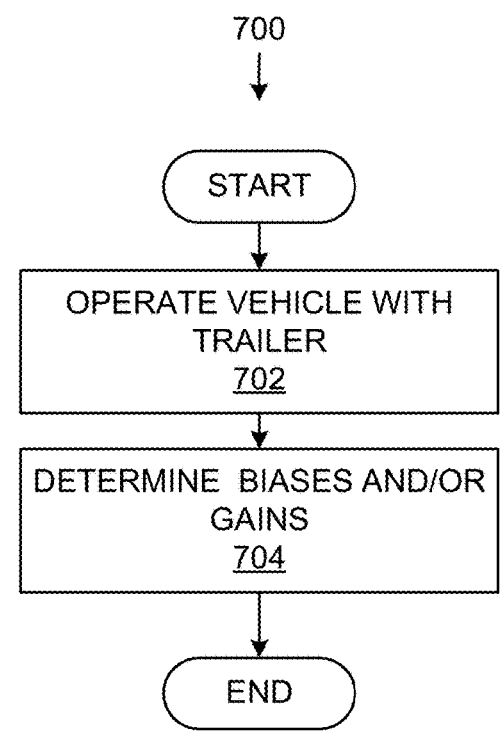
FIG. 7 is a process flow diagram of an example process determining biases and/or gains to be applied to an ADAS based on trailer size metrics.

FIG. 7 is a process flow diagram of an example process 700 for determining biases and/or gains to be applied to an ADAS based on trailer size metrics. The process 700 could begin in a block 702, in which a vehicle 102 is operated with a trailer 104.

The vehicle 102 could be operated with the trailer 104 under various wind conditions, i.e., with different known wind speeds and/or orientations of the wind with respect to a path of the vehicle 102 and the trailer 104. Various ADAS parameters could then be measured, e.g., a steering wheel torque to maintain a vehicle 102 along a path. For example, an ADAS could include a lane centering application that incorporates a proportional-integral-derivative (PID) controller or the like to minimize error as a vehicle follows a specified path; as will be understood, gains and/or biases could be estimated for the PID controller. As will be appreciated, a vehicle could be operated on a test track or real-world roads, and/or operating the vehicle 102 with the trailer 104 under various wind conditions could include a simulation based on a computer aided engineering (CAE) model. If gains and/or biases do not maintain a vehicle 102 along a path, then gains and/or biases can be adjusted, and the vehicle 102 retested under respective wind conditions.

Then, in a block 704, biases and/or gains to be applied to an ADAS could be determined, e.g., using multivariate sensitivity analysis, as mentioned above. In a block 706, a trailer 104 profile could be stored. A set of data comprising a trailer 104 profile can specify, for a trailer 104 with size metrics within a specified range (e.g., dimensions, weights, masses, and/or tongue weights, etc., within their respective specified ranges), biases and/or gains based on respective wind speeds and orientations. The process 700 could then end following the block 706.

Figure 8:
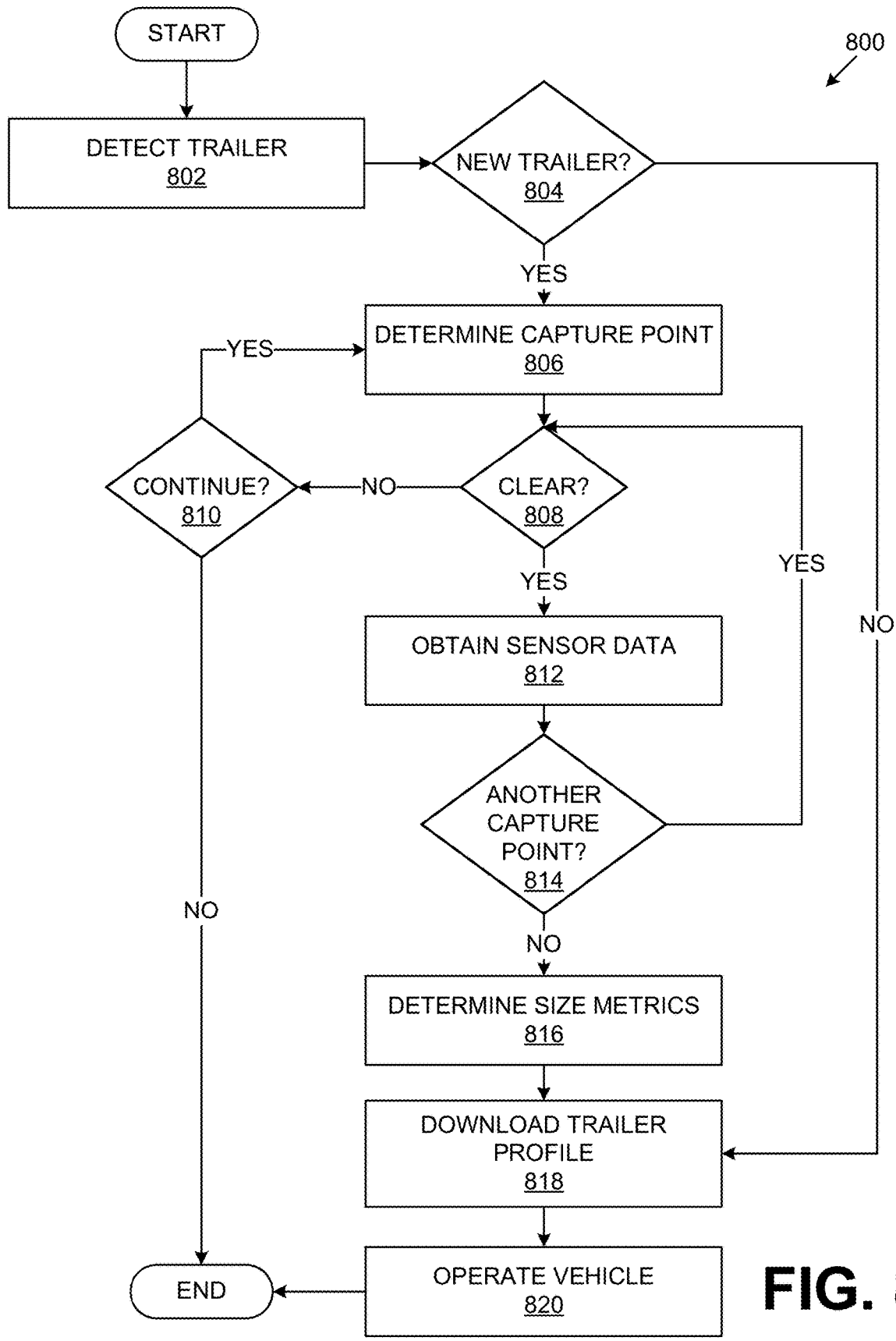
FIG. 8 is a process flow diagram of an example process r operating a vehicle to obtain trailer images and determine size metrics.

FIG. 8 is a process flow diagram of an example process 800 for operating a vehicle 102 to obtain trailer images 140 and determine size metrics. The block 800 begins in a block 802, in which the vehicle computer 106 detects that a trailer 104 is attached to the vehicle 102. For example, the computer 106 could be programmed to detect a trailer 104, e.g., using image recognition techniques based on camera sensor 108c data and/or other suitable techniques based on other sensors 108, upon vehicle 102 startup. Alternatively or additionally, a user could provide input via an HMI 112 or user device that a trailer 104 is attached to the vehicle 102.

Next, in a decision block 804, the computer 106 determines whether the attached trailer 104 is a new trailer 104 for the vehicle 102, i.e., whether the vehicle 102 has previously operated with this trailer 104 attached. For example, a user could provide input that a trailer 104 is a new trailer 104 and/or the computer 106 could determine from sensor 108 data, e.g., an image of a front of the trailer 104 from a rear-facing camera sensor 108c on the vehicle 102, that the trailer 104 is a new trailer 104 for the vehicle 102. If the trailer 104 is a new trailer 104, then a block 806 is executed next. Otherwise, the process 800 proceeds to a block 818.

In the block 806, the computer 106 determines a capture point for the vehicle 102 to capture a trailer image 140. Herein a capture point means a location and orientation of the vehicle 102 to capture a trailer image 140. Determining a capture point can include determining a path of the vehicle 102 from a present location to a second location at which the trailer image 140 can be captured, based in part on the path, e.g., turning of vehicle 102 wheels to obtain a specified orientation of the vehicle 102 with respect to the trailer 104, as described above. However, determining a capture point could include determining that the vehicle 102 is at a capture point, i.e., does not need to be moved. For example, when vehicle 102 wheels are aligned in a longitudinal direction and camera sensors 108c detected that a trailer 104 is longitudinally aligned with the vehicle 102, the vehicle 102 may be at a capture point.

Following the block 806, a block 808, the computer 106 determines whether a path to the determined capture point is clear of obstacles. Any suitable technique, e.g., as part of a SLAM application in the vehicle 102, can be used to determine if the path is clear of obstacles. If the path is not clear, than the process 800 proceeds to a block 820. If the path is clear, than the process 800 proceeds to a block 810.

In the block 810, the computer 106 can determine whether to continue the process 800. For example, if a path to a capture point is not clear, and remains obstructed for more than a predetermined time, e.g., 30 seconds, then the computer 106 could determine to end the process 800. Another example, alternatively or additionally, the computer 106 could receive input to end the process.

In the block 812, the vehicle 102 is operated along the determined path to the capture point. In one example, the computer 106 can output a specified orientation of the vehicle 102 with respect to the trailer 104, typically including a path to achieve the specified orientation, via the HMI 112 or a user device, and a user can operate the vehicle 102 to the capture point. Vehicle sensor 108 data, again provided to a SLAM application, for example, can be used to confirm that the vehicle 102 is at the capture point. Alternatively or additionally, the computer 106 could be programmed to control the vehicle 102, i.e. to actuate one or more vehicle components, e.g., powertrain, steering, and/or braking, to operate the vehicle 102 to the capture point. Once the vehicle 102 is at the capture point, one or more trailer images 140 can be captured by vehicle 102 camera sensors 108c.

Following the block 812, in a block 814, the computer 106 determines whether the vehicle 102 is to be moved to a further capture point. For example, a DNN 144 could be trained to receive as input trailer images 140 from two or more capture points, e.g., as shown in FIG. 2, a first capture point could be with a trailer 104 substantially longitudinally aligned with the vehicle 102, a second capture point could be with the vehicle 102 at an orientation such that vehicle 102 wheels are turned to the left to minimize an angle between a trailer axis 122 and a vehicle axis 124, and a third capture point could be with the vehicle 102 at an orientation such that vehicle 102 wheels are turned to the right to minimize an angle between a trailer axis 122 and a vehicle axis 124. If there is a remaining capture point, then the process 800 returns to the block 808. Otherwise, the process 800 proceeds to the block 816.

In the block 816, the computer 106 inputs trailer images 140 obtained as described above with respect to the block 810 to the DNN 144, which then outputs trailer data 148 including size metrics for the trailer 104.

Next, in a block 818, the computer 106 can download a trailer 104 profile, e.g., obtained as described above with respect to FIG. 7 from the server 120. As explained above, the trailer 104 profile can, based on the size metrics, provide adjustments to ADAS parameters for operating a vehicle 102 ADAS. That is, the trailer profile can include adjustments to ADAS parameters for various wind speeds or ranges of wind speeds and/or directions based on determined trailer size metrics, Next, in a block 820, the vehicle 102 can be operated according to the trailer 104 profile. When the vehicle 102 is no longer operating with the trailer 104 attached, e.g., the vehicle 102 is powered off and/or the computer 106 receives input from a user and/or based on vehicle sensor 108 data that the trailer 104 is disconnected, the process 800 ends.

Figure 9:
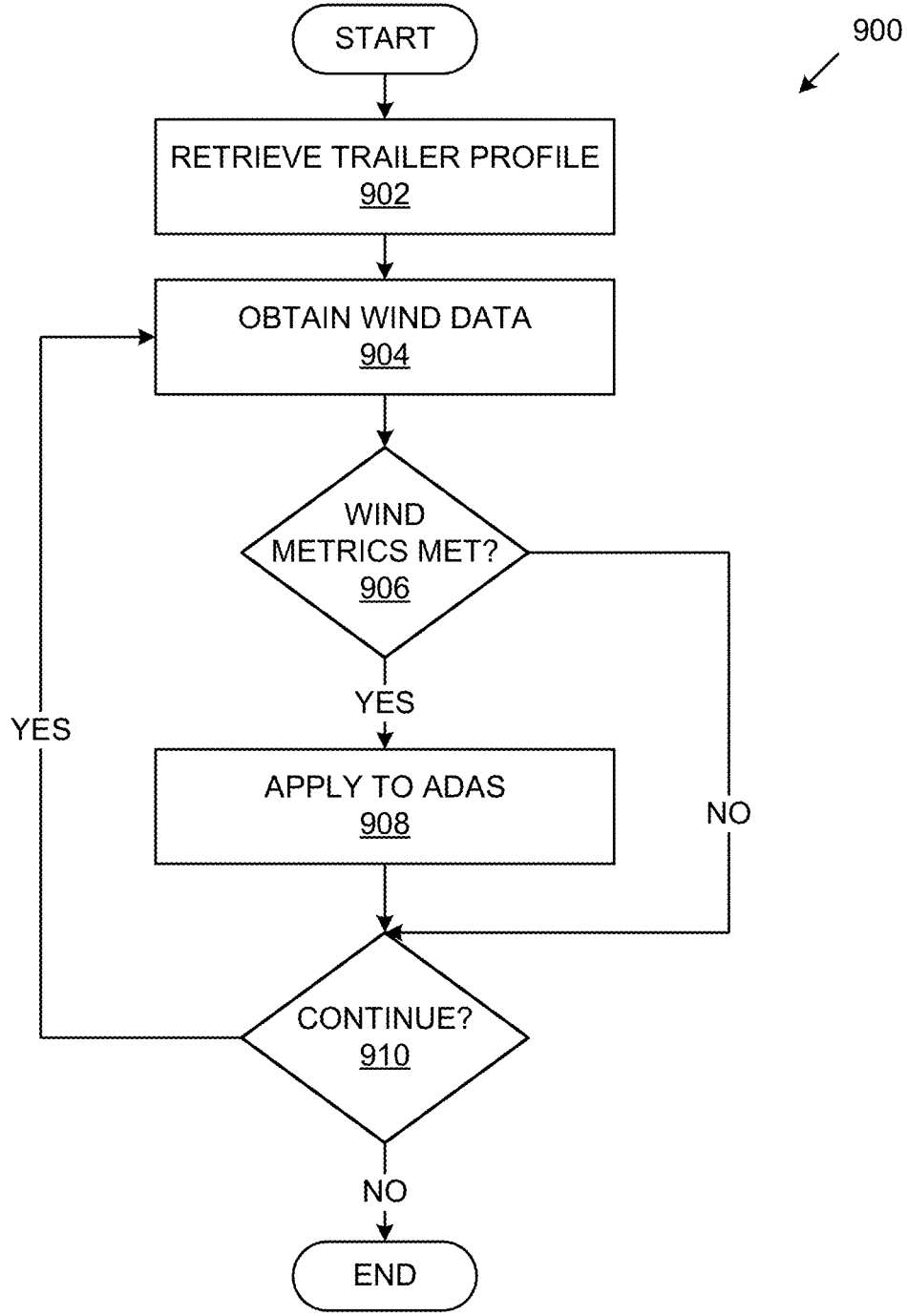
FIG. 9 is a process flow diagram of example process for applying a trailer profile to a vehicle ADAS to operate the vehicle.

FIG. 9 is a process flow diagram of example process 900 for applying a trailer 104 profile to a vehicle 102 ADAS to operate the vehicle 102. The process 900 begins in a block 902 in which the vehicle computer 106 determines that a trailer 104 is attached to the vehicle 102 and determines size metrics, e.g., as explained above with respect to the process 800.

Next, in a block 904, the computer 106 obtains wind data. For example, the computer 106 could be provided with a current location of the vehicle 102 (e.g., from a GPS sensor 108 or the like) and/or a route that the vehicle 102 is to travel (e.g., based on user input), and could obtain current wind data, e.g., describing wind velocity and/or direction, from a remote server 120.

Next, in a block 906, the vehicle computer 106 can determine whether the obtained when data satisfies one or more thresholds for applying a trailer 104 profile to operation of a vehicle 102 ADAS. For example, if wind speed is over a specified threshold, e.g., 30 miles per hour, the computer 106 may determine not to apply a trailer 104 profile, and proceed to a block 910.

In a block 908, the computer 106 applies the trailer 104 profile to one or more ADAS features during vehicle 102 operation.

In the block 910, which can follow either of the blocks 906, 908, the computer 106 determines whether to continue the process 900. For example, if the vehicle 102 is powered off, or user input is received to deactivate application of the trailer 104 profile, the process 900 could end. Otherwise, the process 900 could return to the block 904 to obtain updated wind data.

CONCLUSION

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Computer executable instructions may be compiled or interpreted from computer 100 programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 100. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising a computer that includes a processor and a memory, the memory storing instructions executable by the processor such that the computer is programmed to:

specify paths for a vehicle with an attached trailer to obtain respective orientations for obtaining respective images of the trailer;

receive, after the vehicle obtains at least one of the respective orientations, the respective images of the trailer captured by a vehicle camera at the respective orientations;

input the images to a machine learning program trained to output trailer size metrics; and control the vehicle according to the trailer size metrics output from the machine learning program.

2. The system of claim 1, wherein controlling the vehicle according to the trailer size metrics includes one or both of adjusting a bias or adjusting a gain to a parameters of a steering assist system of the vehicle based on the trailer size metrics and one or both of a direction and magnitude of wind.

3. The system of claim 2, wherein adjusting the bias or the gain adjusts an output steering wheel torque.

4. The system of claim 2, wherein adjusting the bias or the gain adjusts an offset from a lane center.

5. The system of claim 1, wherein the instructions further include instructions to download from a remote server a trailer profile specifying a parameter for controlling the vehicle based on the trailer size metrics output from the machine learning program based on the images.

6. The system of claim 1, wherein the trailer size metrics include one or more of a mass of the trailer, a surface area of the trailer, a weight of the trailer, a tongue weight of the trailer, or a trailer dimension.

7. The system of claim 6, wherein the instructions further include instructions to obtain the tongue weight of the trailer as output from scales onboard the vehicle.

8. The system of claim 6, wherein the instructions further include instructions to obtain the mass of the trailer as output from a vehicle mass estimation module that uses vehicle powertrain data.

9. The system of claim 1, wherein the instructions further include instructions to input an angle of incline to the machine learning program for at least one of the images.

10. The system of claim 1, wherein the instructions further include instructions to control the vehicle to move so that the trailer is at one of the respective orientations.

11. The system of claim 1, wherein the instructions further include instructions to output the respective orientations to a display device.

12. A method, comprising:

specifying paths for a vehicle with an attached trailer to obtain respective orientations for obtaining respective images of the trailer;

receiving, after the vehicle obtains at least one of the respective orientations, the respective images of the trailer captured by a vehicle camera at the respective orientations;

inputting the images to a machine learning program trained to output trailer size metrics; and controlling the vehicle according to the trailer size metrics output from the machine learning program.

13. The method of claim 12, wherein controlling the vehicle according to the trailer size metrics includes one or both of adjusting a bias or adjusting a gain to a parameters of a steering assist system of the vehicle based on the trailer size metrics and one or both of a direction and magnitude of wind.

14. The method of claim 13, wherein adjusting the bias or the gain adjusts one or more of an output steering wheel torque or an offset from a lane center.

15. The method of claim 12, further comprising downloading from a remote server a trailer profile specifying a parameter for controlling the vehicle based on the trailer size metrics output from the machine learning program based on the images.

16. The method of claim 12, wherein the trailer size metrics include one or more of a mass of the trailer, a surface area of the trailer, a weight of the trailer, a tongue weight of the trailer, or a trailer dimension.

17. The method of claim 16, further comprising obtaining the tongue weight of the trailer as one or more of output from scales onboard the vehicle or from a vehicle mass estimation module that uses vehicle powertrain data.

18. The method of claim 12, further comprising inputting an angle of incline to the machine learning program for at least one of the images.

19. The method of claim 12, further comprising controlling the vehicle to move so that the trailer is at one of the respective orientations.

20. The method of claim 12, further comprising outputting the respective orientations to a display device.

* * * * *